Sept. 3, 1957  E. C. CHAPMAN  2,805,315
METHOD OF BUTT WELDING TUBES
Filed Sept. 26, 1955
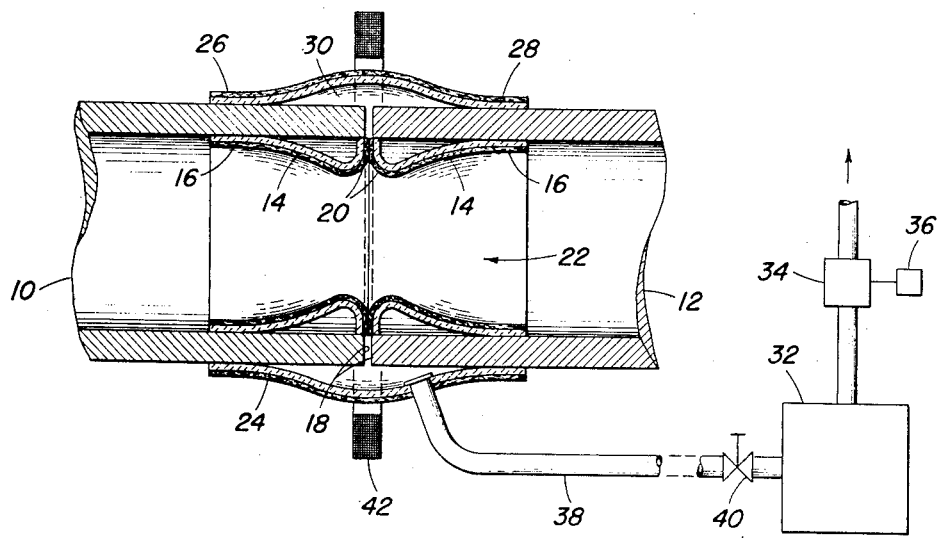
INVENTOR
Edward C. Chapman
BY
*Eldon H. Luther*
ATTORNEY United States Patent Office 2,805,315
Patented Sept. 3, 1957

2,805,315

METHOD OF BUTT WELDING TUBES

Edward C. Chapman, Lookout Mountain, Tenn., assignor to Combustion Engineering, Inc., New York, N. Y., a corporation of Delaware Application September 26, 1955, Serial No. 536,499

4 Claims. (Cl. 219—67)

This invention relates to an improved method of butt welding tubular members within a vacuum by the pressure welding process.

It is well known that with certain metal alloys it is essential that welding operations be conducted with a substantial total absence of oxygen while with substantially all metals improved welds are obtained by the elimination of oxygen during the welding operation. While various methods have been devised for elimination the presence of oxygen, such as surrounding the metal with an inert gas, for certain operations and certain metals welding within a vacuum is the only feasible way of obtaining satisfactory welds. However, maintaining a relatively high vacuum about the area or areas that are to be joined by welding is a relatively difficult task and the present invention is directed to a novel method for achieving this result when butt welding tubular members.

In accordance with the invention the tubular members are spaced in closely spaced coaxial relation with the ends that are to be joined being in abutting or substantially abutting relation. A sealed annular chamber of relatively small volume is formed which encloses these ends. This chamber is then evacuated after which the extreme end portions of the tubular members are heated to a suitable welding temperature with the ends of the tubular members then being forced into engagement. The chamber which encloses the juxtaposed ends of the tubes is comprised of heat resistant sheet material and prior to positioning these ends in coaxial relation and proper position for welding an annulus of this sheet material is inserted into the end of each of the tubes with the end of the annulus remote from the end of the tube being secured to the tube in a fluid tight manner and with the other end of the annulus extending a short distance from the end of the tube. When the tubes are then brought into close proximity to each other and in coaxial relation, the ends of these annuli which extend from the tubes engage one another with these ends being coated with a suitable material which will effect a fluid tight juncture between the annuli. Thereafter an annulus of heat resistant sheet material is positioned about the tubes and secured in a fluid tight manner to the outer wall of the tubes on opposite sides of the interface between the tube ends so that this annulus together with those positioned within the tubes forms a fluid tight chamber enclosing the tube ends.

It is an object of this invention to provide an improved method of butt welding tubular members within a vacuum.

The invention will be more fully understood from the following description when considered in conjunction with the accompanying drawing forming a part thereof and in which the single figure represents a pair of tubular members being butt welded in accordance with the invention.

Referring now to the drawing, wherin like reference characters are used throughout to designate like elements, in the organization depicted therein there is provided tubular members 10 and 12 which are to be butt welded together and which are shown with their ends disposed in immediately adjacent coaxial relation. Positioned within the end of each of these tubular members is an annulus of heat resistant sheet material 14 which is secured in a fluid tight manner to the inner wall of its associated tubular member throughout the circumferential extent of its outer end 16 with this preferably being accomplished by cementing the annulus to the tube wall. These annuli 14 are disposed within tubular members 10 and 12 prior to the positioning of the ends of these members in immediately adjacent coaxial relation and the axial length of these annuli is such that they extend slightly beyond the end face 18 of their respective tubular member with the inner end 20 of the annuli preferably extending radially outward, as shown, so as to provide a relatively broad radial surface with this surface of the two annuli being brought into engagement when the tubular members 10 and 12 have their ends positioned in immediately adjacent coaxial relation, as shown, preparatory to welding these ends together. This relatively broad radial surface formed at the inner ends 20 of the annuli 14 is coated with a suitable cement such that when the surfaces are brought into contact a fluid tight joint will be formed with the two annuli then forming a single annulus designated generally 22 which effectively seals the end faces 18 of tubular members 10 and 12 from the interior of these tubular members.

After this has been accomplished there is positioned about these tubular members the annulus 24 which is also fabricated of heat resistant sheet material and extends across the interface of the juxtaposed tube ends, with the ends 26 and 28 of this annulus being secured in a fluid tight manner throughout their circumferential extent to the outer surface of the tubular members 10 and 12 respectively. Thus the annuli 24 and 26 together form a fluid tight annular chamber 30 of extremely small volume and which encloses the end faces 18 of tubular members 10 and 12.

In order to evacuate or withdraw the air within chamber 30 prior to the welding operation and accordingly eliminate the intolerable effects which the presence of oxygen have during the welding operation there is provided a system which effects extremely rapid evacuation of the members and which includes the container 32 which has a volume many times that of chamber 30 and is maintained under an extremely high degree of vacuum by means of vacuum pump 34 which is driven by motor 36. Communication between container 32 and chamber 30 is had through the conduit 38 which extends through annulus 24 in a fluid tight manner and is provided with a suitable valve 40.

When it is desired to evacuate chamber 30 valve 40, which is normally closed, is opened and because of the greater volume of container 32 as compared with that of chamber 30, the chamber is substantially instantaneously exhausted of air.

Welding heat may be supplied by an electrical induction coil such as 42 which may be positioned about the tubular members in coaxial relation therewith and which preferably lies in the plane of the interface between the juxtaposed ends of these members. This coil is energized after chamber 30 is evacuated with the energization of the coil being effective to heat the extreme ends of tubular members 10 and 12 and raise the temperature thereof to a suitable point so that upon forcing the end faces 18 of these members together with substantial force they become securely united, as is well known in the art of pressure welding. Other means for heating the tube ends to welding temperatures may, of course, be equally well employed, as, for example, electric resistance heating.

The material of which the annuli 22 and 24 is fabricated must, of course, be sufficiently heat resistant to withstand the temperature to which it will be subjected during the heating of the ends of tubular members 10 and 12 to their required welding temperature and for this purpose a thin asbestos sheet glued to paper proves satisfactory. When chamber 30 is evacuated the annuli 22 and 24 will collapse against the associated surface of tubes 10 and 12 which will result in decreasing the size of the chamber and effect a more positive seal.

The annuli 22 and 24 are secured to the walls of the tubular members in relative close proximity to end faces 18 so that the volume of chamber 30 will be as small as practicable with this being an important factor for rapid and sufficiently complete evacuation of the chamber.

While the end faces 18 of tubular members 10 and 12 are generally sufficiently irregular that it is unnecessary to space these members in order to rapidly evacuate the radially inner portion of annular chamber 30 it may be advantageous to maintain the end faces 18 of these tubular members slightly spaced to positively insure rapid evacuation of the entire annular chamber 30.

Thus with the novel method of this invention the confined annular chamber which encloses the ends of the tubes that are to be butt welded is very rapidly evacuated to an extremely high degree of vacuum thereby facilitating rapid and successful welding of the tube ends together.

It will be understood that the above description is intended for the purpose of illustration only and that modifications such as will occur to those skilled in the art are possible and are embraced within the scope and spirit of the invention.

What I claim is:

1. The method of butt welding a pair of metallic tubular members, comprising placing the ends of said members in closely spaced coaxial relation, forming a sealed annular chamber by telescoped wall members closely about the ends of said members and enclosing said ends and being of very limited volume commensurate with its function of enclosing said ends, evacuating said chamber, thereafter locally heating the extreme ends of said members to a welding temperature and then forcing said ends together.

2. The method of butt welding a pair of metallic tubular members, comprising placing the ends of said members in closely spaced coaxial relation, forming a sealed annular chamber by telescoped wall members closely about the ends of said members and enclosing said ends and being of very limited volume commensurate with its function of enclosing said ends, evacuating a container which has a volume several times that of said chamber, connecting said container with said chamber, thereafter locally heating the extreme ends of said members to a welding temperature and then forcing said ends together.

3. The method of butt welding a pair of metallic tubular members comprising securing, in a fluid tight manner, an annulus of heat resistant sheet material to the inner surface of each of said members adjacent the ends to be joined together with each of said annuli extending slightly beyond the adjacent end of its respective member and provided with a coating of material effective to join the annuli together in a fluid tight manner when said ends of the members are brought into immediate adjacent coaxial relation, positioning said ends in immediate adjacent coaxial relation and accordingly joining said annuli together in a fluid tight manner, positioning an annulus of heat resistant sheet material about said members and extending across the interface of said members, securing this last mentioned annulus to the outer surface of said members in a fluid tight manner on opposite sides of but adjacent to said interface so that together with the annuli within said members a fluid tight chamber of small volume is formed which encloses the ends of said members, evacuating said chamber, locally heating the extreme ends of said members to a welding temperature and thereafter forcing said ends together.

4. The method of butt welding a pair of metallic tubular members, comprising placing the ends of said members in closely spaced coaxial relation, providing an annular member within and an annular member about the adjacent ends of said tubular members in bridging relation with the interface of said tubular members and with each annular member being in fluid tight engagement with each tubular member at a location adjacent said interface so that said annular members form a chamber of small volume which encloses the ends of the tubular members, evacuating said chamber of a greater portion of the air disposed therein, thereafter locally heating the extreme ends of said members to a welding temperature and forcing said ends together.

References Cited in the file of this patent

UNITED STATES PATENTS

| | | |
|---|---|---|
| 2,048,556 | McArthur | July 21, 1936 |
| 2,279,854 | Whitney | Apr. 14, 1942 |
| 2,326,296 | Harrison et al. | Aug. 10, 1943 |
| 2,649,527 | Chapman et al. | Aug. 18, 1953 |